455-603 AU 233 EX
OR 3,820,070

United States Patent [19]

Fox

[11] 3,820,070

[45] June 25, 1974

[54] CONTROL SYSTEM FOR A DERRICK UTILIZING LIGHT MULTIPLEX COMMUNICATION LINK

[75] Inventor: Charles W. Fox, Clayton, Mo.

[73] Assignee: McCabe-Powers Body Company, St. Louis, Mo.

[22] Filed: June 16, 1972

[21] Appl. No.: 263,648

[52] U.S. Cl. .......... 340/147 R, 250/199

[51] Int. Cl. .......... H04b 9/00

[58] Field of Search ..... 340/147 R, 168 R; 250/199, 250/227

[56] References Cited

UNITED STATES PATENTS

| | | | |
|---|---|---|---|
| 3,354,451 | 11/1967 | Harris et al. | 250/227 X |
| 3,562,540 | 2/1971 | Hirsch | 250/227 |
| 3,597,684 | 8/1971 | Damen | 250/199 X |
| 3,604,936 | 9/1971 | Kompfner | 250/199 |
| 3,710,122 | 1/1973 | Burcher et al. | 250/199 |

*Primary Examiner*—Donald J. Yusko
*Attorney, Agent, or Firm*—John D. Pope, III

[57] ABSTRACT

A remote control system for a derrick, having an encoder network for producing a plurality of differing electrical control signal frequencies at one location on the derrick and a discriminator network at a second location on the derrick for identifying each electrical control signal frequency produced by the encoder network. An electro-optical converter communicates with the encoder to covert electrical control signal frequencies to analogous light signal frequencies. A light tube communicating with the electro-optical converter transfers the light signal frequencies from the electro-optical converter to an optical-electro converter that communicates with the discriminator and reconverts the light signal frequencies back to their corresponding electrical control signal frequencies. The discriminator communicates with a plurality of output networks that correspond to operating members of the derrick and directs an identified control signal frequency to the output network associated with that frequency.

61 Claims, 7 Drawing Figures

CONTROL SYSTEM FOR A DERRICK UTILIZING LIGHT MULTIPLEX COMMUNICATION LINK

This invention is directed to new and useful improvements in derricks and more particularly to an electro-optical remote control system for regulating and controlling the movable operating members of a derrick and remotely energizing other derrick accessories.

Derricks and the components thereof can usually be operated and controlled at a main control station on or near the base of the derrick. Many derricks also include remote work posts such as aerial work baskets that have an auxiliary control station for remotely operating the main controls. It is well known to transmit control signals from an auxiliary control station to a main control station through hydraulic or electrical signal transmission means. Known signal transmission means often include a separate signal transmission line corresponding to each derrick operating member and accessory that is being remotely controlled. Known derricks that incorporate a multitude of remotely controllable operating members and accessories generally require complex harnessing arrangements to support the separate signal transmission lines, and coding or other identification is usually needed to distinguish one signal transmission line from another. It is thus beneficial to provide a system for remote regulation and control of the operating members and accessories of a derrick wherein all remote control signals can be transmitted through the same signal transmission member regardless of the number of movable operating members and accessories being remotely controlled.

Among the several objects of the present invention may be noted the provision of a novel remote control system for a derrick wherein electrical control signals of differing frequencies that each correspond to a respective operating member or accessory of the derrick are produced at one location on the derrick and passed through the same signal transmission member to a second location on the derrick; a novel remote control system for a derrick wherein different operating members and accessories of a derrick can each be actuated by a different electrical control signal frequency; a novel control system for a derrick wherein a plurality of differing electrical control signal frequencies are each converted to light pulses of corresponding frequencies, all the light frequencies passing through a single light transmission member for detection and identification by a discriminator circuit; a novel remote control system for a derrick wherein a plurality of different control signal frequencies each corresponding to a different operating member or accessory of the derrick are produced at one location on the derrick and are optically transmissible through the same light transmission member to another location on the derrick, each frequency being individually detected by a discriminator network and directed to associate with a respective operating member or accessory of the derrick; a novel remote control system for a derrick wherein the rate and direction of movement of an operating member of the derrick can be regulated by producing a variable duty portion within a cycle of a given control signal frequency corresponding to that operating member; and a novel remote control system for a derrick wherein a plurality of distinctive driving signals corresponding to differing operating members and accessories of the derrick can sequentially actuate their associated operating members and accessories and maintain said operating members and accessories in substantially simultaneous operation. Other objects and features will be in part apparent and in part pointed out hereinafter.

The present invention relates to a novel remote control system for a derrick. Each operating member and accessory of the derrick that is to be remotely controlled is associated with a different electric control signal frequency. The electric control signal frequencies are each converted to light pulses of a corresponding frequency with all light signal frequencies being transmissible through the same light transmission member.

In the embodiment disclosed the duration of a light pulse represents a duty portion within one cycle of a particular electric control signal frequency. The duration of the duty portion in such signal cycle can be varied and corresponds to the rate of movement as well as indicating the direction of movement of a derrick operating member. An electric control signal frequency can also be arranged to have a fixed duty portion for each cycle such that the presence or absence of the duty portion serves to provide on/off actuation of a derrick accessory.

Any combination of the remotely controllable operating members and accessories of the derrick can be maintained in simultaneous operation through repetitive production by an encoder network of the control signal frequencies associated with each derrick component. The electrical control signal frequencies are converted at one location to corresponding light frequencies that are transmitted through the same light transmission tube to a second location for reconversion back to an electrical control signal frequency. A discriminator network within the control system identifies the reconverted electrical control signal frequencies and measures the duty portions of the signals. The discriminator network then directs the identified electrical control signal frequency to a corresponding operating member or accessory that is associated with that particular signal frequency.

All operating members and accessories of the derrick can be sequentially activated by sequential production of the control signal frequencies corresponding to each member and accessory. The activated members and accessories are maintained in simultaneous operation by including means in the output networks for maintaining an operating member or accessory in operation for a predetermined time until such operating member or accessory is sequentially activated again. Thus, those operating members and accessories that are being activated can be maintained in continuous operation during the reactivation time interval.

The invention accordingly comprises the constructions and methods hereinafter described, the scope of the invention being indicated in the following claims.

In the accompanying drawings, in which one of various possible embodiments of the invention is illustrated, FIG. 1 is a simplified schematic diagram of the encoder network, the electro-optical conversion means, the light transmission tube, and the optical-electro conversion means incorporated in the present invention;

Figure 5:
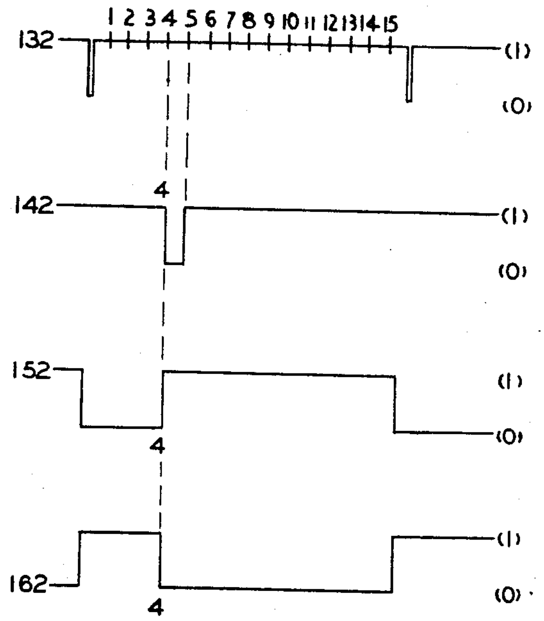
Figure 6:
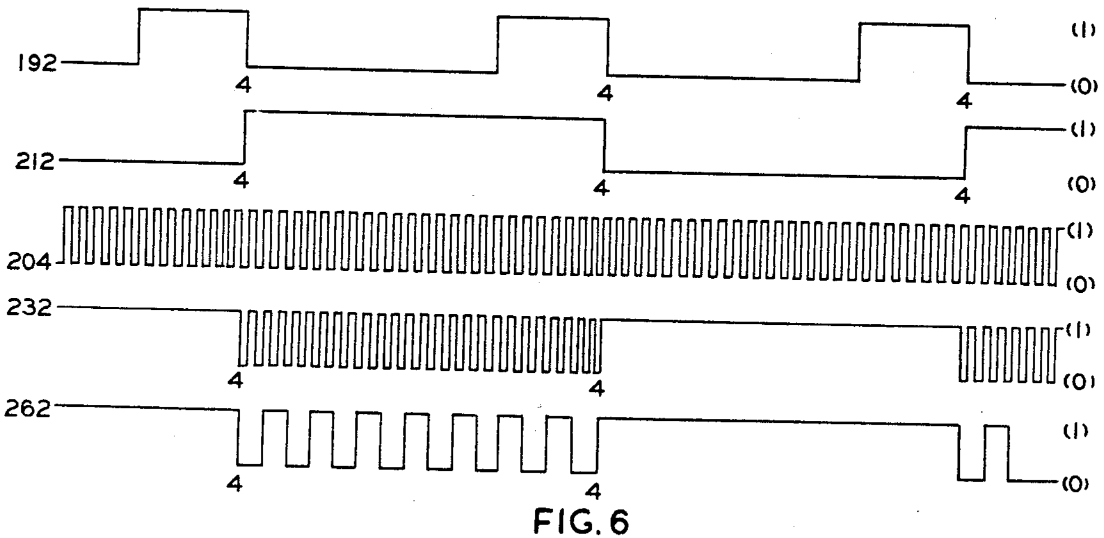
Figure 7:
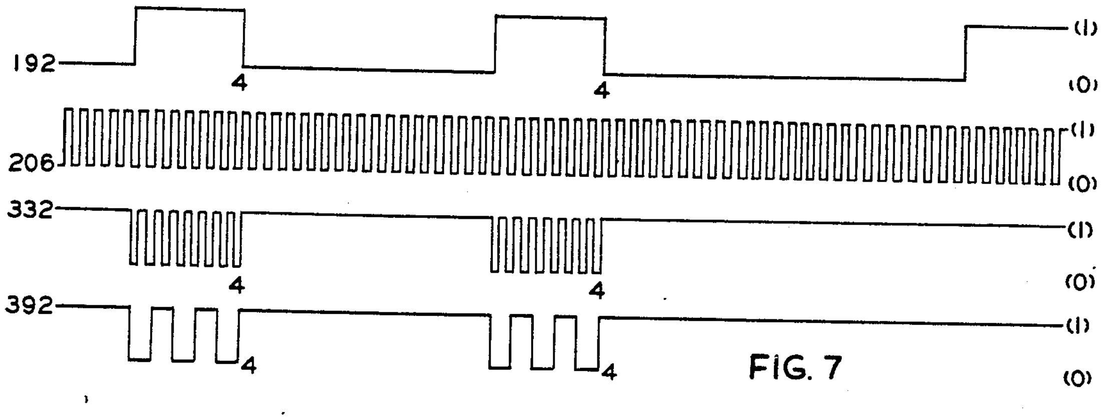

FIG. 5 contains binary wave forms showing the development of a duty portion of a control signal frequency produced in the encoder network;

FIG. 6 contains binary wave forms showing the identification of a control signal frequency in the discriminator network; and FIG. 7 contains binary wave forms showing the measurement of the duty portion corresponding to the identified control signal frequency.

Referring now to the drawings for a detailed description of the present invention, a remote control system for a derrick incorporating one embodiemnt of the present invention has been broken down for convenience into a control encoder network A, a discriminator network B, proprotional output networks C, D, E and F and digital driver networks G, H, I and J.

Control encoder network A can be disposed in a derrick work basket or any other location on the derrick having remote controls for controlling the operating members and accessories of the derrick. Encoder network A comprises any suitable signal source generator 20 for generating a 100 KHZ output square wave signal.

Reference No. 30 generally designates a counter such as Signetics part No. 8288A.

Reference No. 40 generally designates a two input four-bit multiplexer such as Signetics part No. N8266B. Multiplexer 40 communicates with counter 30 through a conductor 32 and also communicates with signal source 20 through a conductor 24.

Reference No. 50 generally designates a four-bit binary counter/storage element such as Signetics part No. N8281A. Counter 50 communicates with multiplexer 40 through conductor 42.

Reference No. 6 generally designates a decoder such as Signetics part No. N8252B. Decoder 60 communicates with counter 50 through conductors 52, 54 and 56. Decoder 60 also includes eight conductors 61, 62, 63, 64, 65, 66, 67, 68 connected to eight respective terminals thereon. Conductors 61 through 68 form lines of communication between decoder 60 and eight transmitter channel switches 71–78. A buffer device 79 such as Signetics part No. N7407 is provided on conductors 61 to 68 between each transmitter channel 71–78 and decoder 60.

Switches 71–74 are of known construction, each comprising a movable contact arm 80 connected to a respective conductor 61–64. Switches 71–74 also include fifteen contact positions designated 2–8, T and 9–15, contact T representing a non-operative neutral position. Switches 75–78 are also of known construction, each comprising a movable contact arm 82 connected to a respective conductor 65–68. Switches 75–78 also include two contact positions, one of which is a neutral position and therefore designated T. Reference No. 8 designates the remaining contact position on switches 75 and 76, whereas reference No. 9 designates the remaining contact position on switches 77, 78. The neutral contact positions T of switches 71–78 are commonly connected to a conductor 84. A conductor 86 and a conductor 88 form a line of communication between conductor 84, multiplexer 40 and counter 30, respectively.

Reference No. 90 generally designates a four-bit binary counter/storage element having the same Signetics part number as counter 50. Counter/storage element 90 communicates with counter 50 through conductors 53, 55 and 57 connected to conductors 52, 54 and 56, respectively.

Reference No. 100 generally designates a monostable multivibrator network or oneshot device such as Signetics part No. N8T22A. Oneshot device 100 communicates with counter/storage element 90 through conductors 92, 102 and 103.

Reference No. 110 generally designates a counter identical to counter 30. Counter 110 communicates with oneshot device 100 through conductor 102 and signal source 20 through a conductor 22.

Reference No. 120 generally designates a counter having the same Signetics part number as counter 50 and communicates with counter 110 through a conductor 112.

Reference No. 130 generally designates a oneshot device having the same Signetics part number as oneshot 100. Oneshot 130 communicates with counter 120 through conductors 128, 129 and 134.

Reference No. 140 generally designates a sixteen input five-bit multiplexer such as Signetics part No. N74150N. Fourteen terminals on multiplexer 140 are designated 2–15 corresponding to contact positions 2–15 on switches 71–74. Although not shown in the diagram, terminal 2 of multiplexer 140 is connected in common to all No. 2 contact positions of switches 71–74. In a like manner and also not shown on the diagram the remaining terminals on multiplexer 140 are connected in common to their numerically corresponding contact positions on switches 71–74. These connections have been omitted from the diagram for purposes of schematic simplification. Multiplexer 140 communicates with counter 120 through conductors 122, 124, 126 and 128 and also communicates with signal source 20 through a conductor 26.

Reference No. 150 generally designates a bistable multivibrator or flip-flop device such as Signetics part No. N7476B. Flip-flop 150 communicates with oneshot 130 through a conductor 132 and communicates with multiplexer 140 through a conductor 142. Flip-flop 150 also communicates with counter 30 through conductors 152 and 153.

Reference No. 160 generally designates a nand gate such as Signetics part No. N8880A. Nand gate 160 communicates with flip-flop 150 through conductor 152 and also communicates with conductor 84.

Reference No. 170 generally indicates any suitable electro-optical conversion means for converting an electrical signal to a light singal such as a Monsanto ME6 infra-red light emitting diode in combination with any suitable known diode driver network. Electro-optical conversion means 170 communicates with nand gate 160 through a conductor 162.

Reference No. 172 generally designates any suitable flexible light transmitting tube such as Crofon optic fiber sold by duPont. Light tube 172 has the electrical properties of an insulator, is suitably shielded from outside light and can transmit light from source 170 around curved as well as straight paths. Light tube 172 also has an overall diameter of approximately, 0.1 inches and extends approximately 65 feet from the derrick basket along the inner and outer beams of the derrick such as is disclosed in copending Balogh application Ser. No. 165,916, filed July 26, 1971.

Light tube 172 joins any suitable known conversion means 180 for converting a light signal to an electrical signal such as a Siemens BPY 61/111 photo detector. A conductor 182 joins optical-electro conversion means 180 to any suitable known photo amplifier 190 and a conductor 192 interconnects photo amplifier 190 with discriminator network B. It should be noted that although discriminator network B communicates with encoder network A through light tube 172, the networks A and B are insulated from each other since light tube 172 in not electrically conductive.

Discriminator network B comprises a 100 KHZ square wave generator 200 identical to generator 20.

Reference No. 210 generally designates a bistable multivibrator or flip-flop such as Signetics part No. N8824B. Flip-flop 210 communicates with conductor 192 through a conductor 194.

Reference No. 220 generally designates a flip-flop identical to flip-flop 210 that communicates with flip-flop 210 through conductors 212 and 214.

Reference No. 230 generally designates a nand gate such as Signetics part No. N8870A. Nand gate 230 communicates with flip-flops 210 and 220 through conductors 212 and **222*a*, respectively and also communicates with signal source 200 through a conductor 204**.

Reference No. 240 generally designates a counter/storage element identical to counter/storage element 50. Counter/storage element 240 communicates with nand gate 230 through a conductor 232.

Reference No. 250 generally designates a monostable multivibrator or oneshot device identical to oneshot device 100. Oneshot device 250 communicates with counter 240 through a conductor 242 and conductors 252, 254.

Reference No. 260 designates a counter identical to counter 30 that communicates with oneshot device 250 through conductor 252.

Reference No. 270 generally designates a counter such as Signetics part No. N8280A that communicates with counter 260 through a conductor 262. Counter 270 also communicates with flip-flop 220 through conductors 273, 277 and 279.

Reference No. 280 generally designates a four-bit binary counter/storage element identical to counter/storage element 50. Counter/storage element 280 communicates with counter 270 through conductors 271–274.

Reference No. 290 generally designates a decode identical to decoder 60. Decoder 290 communicates with counter/storage element 280 through conductors 281–283 and is also provided with output conductors 291–298.

Reference No. 300 generally designates a comparator such as Signetics part No. N8242A that communicates with counter 270 through conductors **271–278*a* and communicates with storage register 280 through conductors 281–283 and 284–286**.

Reference No. 320 generally designates a shift register such as Signetics part No. N8271B, Shift register 320 communicates with flip-flop 210 through conductors 216, 218 and communicates with signal source generator 200 through conductors 206 and 208. Shift register 320 also communicates with counter 260 through conductors 322, 328 and communicates with counter 270 through conductor 322 and further communicates with storage register 280 through a conductor 324.

Reference No. 330 generally designates a nand gate identical to nand gate 160. Nand gate 330 communicates with signal source generator 200 through conductor 206 and also communicates with conductor 192 through conductor 196.

Reference No. 340 generally designates a counter/storage element identical to counter/storage element 50. Counter/storage element 340 communicates with nand gate 330 through a conductor 332.

Reference Nos. 350, 360 and **370*a* generally designate nand gates identical to nand gate 160. Nand gates 350, 360 and 370*a* communicate with counter/storage element 280 through conductors 281 and 287, 282 and 288 and 283 and 289, respectively. Nand gates 350, 360, and 370*a* also communicate with counter 340 through conductors 352, 362 and 372**, respectively.

Reference No. 380 generally designates a oneshot device identical to oneshot device 100. Oneshot 380 communicates with counter 340 through conductors 342, and 382, 384.

Reference No. 390 generally designates a counter identical to counter 30 that communicates with oneshot 380 through conductor 382.

Reference No. 400 generally designates a counter identical to counter 50 that communicates with counter 390 through a conductor 392.

Reference Nos. 420 and 430 generally designate oneshot devices identical to oneshot 100. Oneshot 420 communicates with flip-flop 210 through a conductor 216. Oneshot 430 communicates with conductor 192 and also communicates with counters 390 and 400 through conductors 432, 434 and 432, 436, respectively.

Reference No. 440 generally designates a counter/storage element identical to counter/storage element 50. Counter/storage element 440 communicates with counter 400 through conductors 401–404 and also communicates with one-shot 420 through conductor 422. A conductor 449 communicates with counter/storage element 440 through a conductor 444.

Reference No. 450 generally designates a comparator identical to comparator 300. Comparator 450 communicates with counter 400 through conductors 401–408 and also communicates with counter/storage element 440 through conductors 441–448.

Reference No. 460, generally designates any suitable known quad exlcusive OR element. Quad exclusive OR element 460 communicates with counter/storage element 440 through conductors 441 and **444*a*, 442 and 444*b*, and 443 and 444, respectively. Quad exclusive OR element also includes output conductors 462, 464 and 466**, respectively.

Reference Nos. 490, 500, 510 and 520 generally designate nand gates identical to nand gate 160. Nand gate 490 communicates with shift register 320 through a conductor 326. Nand gate 600 communicates with nand gate 490 through a conductor 492 and also communicates with comparators 300 and 450 through conductors 302, 452 and 454. Nand gate 510 communicates with nand gate 500 through conductor 502. Nand gate 520 communicates with nand gate 510 through a conductor 512 and communicates with counter 260 through a conductor 264. Nand gate 520 also communicates with decoder 290 through a conductor 522.

The remote control system for a derrick further includes four dual proportional output networks C, D, E and F, communicating with conductors 291–294, respectively.

Dual proportional output network C comprises a counter 600 identical to counter 50 that communicates with discriminator network B through conductors 449, 462, 464 and 466. Counter 600 also communicates with conductor 291 through a conductor 291*a*.

Reference No. 610 generally designates any suitable known digital to analog converter and communicates with counter 600 through conductors 602, 604 and 606.

Reference No. 620 generally designates any suitable known pulse omission detector. Pulse omission detector 620 communicates with discriminator network B through conductor 291.

Reference No. 630 generally designates any suitable known switching network such as a decoder identical to decoder 60. Switching network 630 communicates with counter 600 through conductor 449*a* and also communicates with pulse omission detector 620 through a conductor 622.

Reference No. 640 generally designates any suitable known power amplifier. Power amplifier 640 communicates with digital to analog converter 610 through a conductor 612 and also communicates with switching network 630 through a conductor 632.

Reference No. 650 generally designates a power amplifier identical to amplifier 640. Power amplifier 650 communicates with digital to analog converter 610 through conductors 614, 612 and also communicates with switching network 630 through a conductor 634.

Reference No. 660 generally designates any suitable known solenoid communicating with power amplifier 640 through a conductor 642.

Reference No. 670 generally designates a solenoid identical to solenoid 660 that communicates with power amplifier 650 through a conductor 652.

Dual proportional output network D is of substantially identical arrangement with network C and communicates with discriminator network B through conductors 292, 449, 462, 464 and 466. Components 700, 710, 720, 730, 740, 750, 760 and 770 of network D identically correspond to components 660–670 of network C.

In a like arrangement dual proportional output network E communicates with discriminator network B through conductors 293, 449, 462, 464 and 466. Components 800–870 identically correspond to components 600–670 of network C.

Similarly dual proportional output network F communicates with discriminator network B through conductors 294, 449, 462, 464 and 466. Components 900–970 identically correspond to components 600–670 of network C.

The remote control system for a derrick further includes four digital driver output networks G, H, I and J communicating with conductors 295–298, respectively.

Digital driver output network G comprises any suitable known pulse omission detector 1000 capable of driving a relay. Pulse omission detector 1000 communicates with discriminator network B through conductor 295 and also communicates with a relay 1010 through a conductor 1002.

Digital driver output network H is of substantially identical arrangement with network G and communicates with discriminator network B through conductor 296. Components 1100 and 1110 of output network H identically correspond to components 1000 and 1010 of output network G.

In a like arrangement, digital driver output network I communicates with discriminator network B through conductor 297. Components 1200 and 1210 of output network I identically correspond to components 1000 and 1010 of network G.

Similarly digital driver network J communicates with discriminator network B through conductor 298. Components 1300 and 1310 of network J identically correspond to components 1000 and 1010 of network G.

In operation of the remote control system any known operating members of a derrick such as the movable beams, the rotatable turret, the extensible hoist, etc. can each be controlled at proportional rates of movement by a respective transmitter channel switch 71–74. Transmitter channel switches 75–78 can each control an accessory such as a buzzer device, a lamp, a starter switch for an engine or an engine kill switch. Although the present embodiment of the invention discloses 8 switches corresponding to 8 derrick operating members and accessories the same general operating principles discussed herein are applicable to remote control systems having a greater or lesser amount of operating members and accessories.

Transmitter channel switch 71, for example, can control the rate of movement as well as the direction of movement of an articulating derrick beam such as that disclosed in U.S. Pat. No. 3,628,675. When movable contact arm 80 of switch 71 engages any of the contacts 2 through 8, the derrick beam articulates in one direction, the rate of movement being dependent upon the contact engaged by contact arm 80. As movable contact arm 80 progresses from contact 8 to contact 2 the derrick beam moves at an increasingly faster rate. Conversely when contact arm 80 engages any of the contacts 9 through 15, the derrick beam will articulate in a second direction opposite to the first direction at increasingly faster rates as movable contact arm 80 progresses from contact 9 to contact 15. When movable contact arm 80 engages neutral contact T, the derrick beam controlled by switch 71 is inoperative.

In a like manner one of the transmitter channel switches 72–74 can bidirectionally control extensible movement at a proportional rate of another derrick operating memer. Rotational movement can be similarly controlled by one of the switches 72–74. Thus articulating extensible and rotational movement as well as other known forms of movement can be bidirectionally controlled at variable rates.

Transmitter channel switch 75 can control actuation of a buzzer device, contact 8 representing the on position of the buzzer device and contact T corresponding to the off position thereof.

In a like manner transmitter channel switches 76–78 can each control actuations of other known derrick accessories.

In encoder network A as well as the other networks to be discussed a voltage level of 5 volts in any circuit component or conductor corresponds to a logic level of one whereas voltage levels of zero such as the ground correspond to a logic level of zero. Signal source 20 transmits a 100 KHZ square wave or clock pulse to multiplexer 40, counter 90 and multiplexer 140.

Multiplexer 40 transmits the 100 KHZ signal to counter 50 which is connected as a three-bit binary counter. Counter 50 then makes a binary count from zero to seven and back to zero again of the 100 KHZ signal. Decoder 60 connected as a binary to decimal decoder activates one of the conductors 61–68 to a logic level of zero depending upon the binary count state of counter 50. Thus when counter 50 is at a binary count state of zero, conductor 61 is at a logic level of zero. In a like manner when counter 50 is at a binary count state of one, conductor 62 is at a logic level zero. Similarly conductors 63–68 are sequentially activated by the 100 KHZ signal in counter 50 to logic levels of zero as counter 50 goes through the binary count states of 2 through 7.

Further operations of encoder A will be described in terms of illustrative examples. As a first example assume that counter 50 is at a binary count state of three, such that conductor 64 of decoder 60 is activated to a logic level of zero. It will also be assumed that movable contact arm 80 of switch 74 is engaged with contact T. The zero logic level of conductor 64 is transmitted through contact arm 80 of switch 74 to conductors 84, 86 and 88 such that conductors 84, 86 and 88 also have a logic level of zero.

When conductor 86 is at a logic level of zero multiplexer 40 permits clock pulses from source 20 and conductor 24 to be transmitted to conductor 42 enabling counter 50 to use one of these clock pulses to progress to the next binary count state. Furthermore, when conductor 88 is at a logic level of zero counter 30 is inhibited from communicating with multiplexer 40 through conductor 32. It should be noted that when any neutral contact T is at a zero logic level due to activation of a conductor 61–68 by decoder 60 conductor 84 will likewise be placed at a zero logic level. The zero logic level at a neutral contact T of a switch being interrogated by decoder 60 is thus a dominant logic level despite any non-zero logic levels at a neutral contact T of switches not being interrogated.

During the time that multiplexer 40 permits clock pulses from conductor 24 to enter counter 50 through conductor 42 encoder network A is in a search mode. As a characteristic of the search mode counter 50 commands decoder 60 to sequentially look at a particular channel transmitter switch through conductors 61–68 such as switch 74 through conductor 64 to determine if switch 74 is in an operational contact position. Should switch 74 be in the neutral contact position T, the logic level zero of conductor 64 transmitted to conductors 84 and 86 enable multiplexer 40 to permit counter 50 to count at clock rate to the next binary count state in search of a transmitter channel switch that is in an operational contact position.

If all the transmitter channel switches 71–78 are in the non-operational or neutral contact position T, the search mode continues wherein counter 50 passes through the binary count states of zero through 7 at clock rate repeating this count sequence until a transmitter channel switch is found to be in an operative position. The binary count state of counter 50 is thus a channel determining device in encoder network A. It should be noted however that when any transmitter channel switch under interrogation by decoder 60 is not at the neutral contact position T conductors 84, 86 and 88 achieve a logic level of one. This situation will be discussed in detail in connection with the operation of multiplexer 140.

The 100 KHZ signal that enters counter/storage element 90 through conductor 22 is divided by N where N equals 1, 2, 3, 4, 5, 6, 7 or 8, the value of N at counter 90 being dependent upon the binary count state of counter 50 as communicated to counter 90 through conductors 52–57. For example, counter 90 can be arranged in a known manner with oneshot 100 to divide the 100 KHZ input signal from conductor 22 by eight when counter 50 is at a binary count state of zero, and to divide the 100 KHZ signal by seven when counter 50 is at a binary count state of one and divide the 100 KHZ signal by six when counter 50 is at a binary count state of two and so on, eventually dividing the 100 KHZ signal by one when counter 50 is at a binary count state of seven. Following the binary count state of seven counter 50 will repeat the binary count sequence from zero to seven wherein the divide by N command sequence in counter 90 and oneshot 100 repeats itself.

Conductor 102 transmits a signal frequency of 100/N KHZ into counter 110 which is connected as a divide by six counter. Thus conductor 112 transmits a signal frequency of 100/N×6 KHZ into counter 120 which is arranged in a known manner with oneshot 130 to operate on the 100/N×6 KHZ signal as a divide by fifteen counter. Conductor 132 then transmits a signal frequency of 100/N×6×15 KHZ. Consequently when N equals 1 counter 120 and oneshot 130 will provide a control signal frequency of 1,100 HZ. When N equals 2 the control signal frequency is 554 HZ. When N equals 3 the control signal frequency is 370 HZ. When N equals 4 the control signal frequency is 278 HZ. When N equals 5 the control signal frequency is 222 HZ. When N equals 6 the control signal frequency is 185 HZ. When N equals 7 the control signal frequency is 158 HZ. When N equals 8 the control signal frequency is 139 HZ.

Each control signal frequency corresponds to a respective transmitter channel switch 71–78. Switch 71 corresponds to 139 HZ, switch 72 corresponds to 159 HZ, switch 73 corresponds to 185 HZ, switch 74 corresponds to 222 HZ, switch 75 corresponds to 278 HZ, switch 76 corresponds to 370 HZ, switch 77 corresponds to 554 HZ, and switch 78 corresponds to 1,100 HZ. Although the switches herein disclosed are associated with the above-mentioned frequencies, the matching of a particular switch with a particular signal frequency is purely arbitrary.

Multiplexer 140 receives a binary count state from 1 to 15 through conductors 122, 124, 126 and 128 of counter 120. As lines 2–14 of multiplexer 140 are connected in common with the correspondingly numbered contacts 2–14 of transmitter channel switches 71–74 lines 2–14 can sequentially interrogate contacts 2–14 as determined by the binary count state of counter 120. Thus when counter 120 is at a binary count state of one none of the output lines are activated providing a nonfunctional time lapse. When counter 120 is at a binary count state of two, output line 2 on multiplexer 140 and the number 2 contact position of a transmitter channel switch 71–74 activated by decoder 60 is interrogated. If movable contact arm 80 of the decoder 60-activated switch is not at contact position 2, conductor 142 will be at a logic level one. Furthermore if the decoder 60-activated switch is at neutral contact position T conductor 142 will have a logic level of one during interrogation of contacts 2–15 by multiplexer 140. Thus conductor 142 is normally at a logic level of one except when multiplexer 140 finds a decoder 60-activated transmitter channel switch in an operable contact position, a situation that will be hereinafter discussed.

Assume that contact arm 80 of transmitter channel switch 71 is at contact position 4. Decoder 60 activates conductor 61 to interrogate switch 71 when conductor 50 is at a binary count state of zero. As movable contact member 80 of switch 71 is not engaging neutral contact T, conductors 84, 86 and 88 will be at a logic level of one. A logic level of one in conductors 84 and 86 prevents the search mode binary count sequence in counter 50 from continuing by preventing multiplexer 40 from passing clock signals from source 20 to conductor 42. With the search mode sequence thus arrested the attention of decoder 60 is prolonged on conductor 61 and transmitter channel switch 71.

As binary counter 50 is at a count state of zero, counter 90 divides the 100 KHZ conductor 22 by N equals 8. Counter 110 divides the 100/8 KHZ signal by 6 and counter 120 divides the 100/8×6 KHZ signal by 15 such that a 139 HZ signal is present in conductor 132 corresponding to the decoder 60-activated switch 71.

Multiplexer 140 sequentially interrogates all contact positions 2–15 of switch 71 at a rate equal to 100/8×6 KHZ. All contact positions 2–15 are interrogated even after an engaged contact on switch 71 is discovered. Thus when counter 120 is at a binary count state of 4, conductor 4 of multiplexer 140 interrogates contact position 4 of switch 71 which is engaged with movable contact arm 80. Consequently a logic level of zero is produced at conductor 142 during the time interval that multiplexer 140 interrogates conductor 4. Thereafter multiplexer 140 will continue sequential interrogation of all other contact positions on switch 71 producing a logic level of one at conductor 142 during interrogation of switch 71 contacts 2, 3, and 5–15. During the interrogation sequence, multiplexer 140 is fed 100 KHZ clock pulses by conductor 26 to eliminate slivers in conductor 142. The conductor 26 clock pulses inhibit multiplexer 140 from producing an output signal at conductor 142 for the time interval that elapses between sequential deactivation and activation of interrogated conductors 2–15.

Reference is now made to FIG. 5, wherein the wave forms illustrated correspond to interrogation of switch 71 by multiplexer 140 for the condition where switch 71 is engaged at the number 4 contact position. The signal in conductor 132 is a wave form characterized by spaced pulses attributable to oneshot 130. The spacing between consecutive oneshot pulses represents the cycle period of a 139 HZ control signal frequency. This period is divided into time intervals that correspond to the time intervals that multiplexer 140 interrogates conductors 2–15 of switch 71. The signal in conductor 142 which is normally at a logic level of one is reduced to a logic level of zero during the time interval that multiplexer 140 interrogates conductor 4, which in accordance with the example, is connected to contact 4 of switch 71.

The signals in conductors 132 and 142 enter flipflop 150 and emerge in conductor 152 as a wave cycle having an initial low portion that changes to a high portion at the instant multiplexer 140 interrogates contact position 4 of switch 71. This high portion of the conductor 152 signal is sustained until the wave form in conductor 132 is pulsed again by oneshot 130. Thus one cycle of the wave form in conductor 152 has the same period as a 139 HZ signal. It should be noted that if switch 71 were engaged at the number 3 or 5 contact position, for example, the conductor 142 signal would go low for the time period corresponding to interrogation of the 3 or 5 contact position by multiplexer 140. Consequently the low portion of the conductor 152 signal has a variable time interval dependent upon the engaged contact position of switch 71, the period of the conductor 152 signal being constant irregardless of the numerical contact engaged on switch 71.

The conductor 152 signal passes into nand gate 160 and into electro-optical conversion means 170 which is arranged in any suitable known manner to provide a light pulse when conductor 162 is at a logic level of one. Consequently conversion means 170 will yield light pulses for a period equivalent to the up time portion of the conductor 162 signal. This up time portion is defined as the duty portion of the 139 HZ control signal.

Since the duration of the duty portion of the 139 HZ duty cycle signal is dependent upon the engaged contact position of contact arm 80 in switch 71, the duty portion is a maximum when contact 2 is engaged by arm 80 and a minimum when contact 8 is engaged by arm 80. The duty portion for contacts 9–15 of switch 71 which represent movement in reverse to that of contact positions 2–8 can be operated upon to obtain a duty signal that is identical to the duty cycle signals of contacts 2–8. This operation will be described in connection with the discussion of discriminator network B.

The light pulse signal frequency from light source 170 is transmitted through light tube 172 into optical-electro conversion means 180 which converts the light pulse in any suitable known manner into an electrical control signal frequency in conductor 182 that is identical to the control signal frequency in conductors 152 and 162. As a safety precaution an extra light tube (not shown) can be included in the remote control system should tube 172 become damaged. The conductor 182 signal is then amplified in any known manner in amplifier 190 such that the signal emerging in conductor 192 has substantially the same frequency and duty portion characteristics of the conductor 162 signal.

The conductor 152 signal is also transmitted through conductor 154 to counter 30. As conductor 88 is at a logic level of one with switch 71 in the number 4 contact position counter 30 is enabled to provide an output at conductor 32 of one pulse for every six pulses through conductor 154. Conductor 86 also being at a logic level of one inhibits multiplexer 40 from accepting clock pulses from conductor 24 while allowing multiplexer 40 to accept pulses from counter 30 through conductor 32. Multiplexer 40 now provides one output pulse at conductor 42 for one input pulse from conductor 32. Since multiplexer 40 accepts pulses from counter 30 and not from signal source 20 the search mode sequence of counter 50 is retarded from a 100 KHZ clock rate to a 139/6 HZ rate. Consequently since counter 90 continues to receive 100 KHZ pulses from signal source 20 multiplexer 140 can make six sequential interrogations of switch 71, sending six cycles of the 139 HZ control signal frequency through conductor 152 before counter 50 progresses to the next binary count state that corresponds to interrogation of switch 72 by decoder 60. Thus six pulses of light corresponding to six duty portions of the 139 HZ duty signal pass through light tube 172 to discriminator network B.

If switch 72 is in a non-operative position wherein contact arm 80 engages neutral contact T, conductors 84, 86 and 88 attain a logic level of zero. Multiplexer 40 is thus inhibited from receiving pulses from counter 30 and is again enabled to receive clock pulses from signal source 20 through conductor 24. The search mode sequence of counter 50 at a 100 KHZ clock rate is thus re-established.

Encoder network A operates as previously described whether a multicontact switch such as switch 71 or a single contact switch such as switch 75 is being interrogated by decoder 60 and multiplexer 140. It should be noted with respect to switches 75–78 that the duty portion for each control signal frequency associated with switches 75–78 has a fixed value since switches 75–78 have only one operative contact position.

Under the disclosed arrangement of encoder network A any number of switches 71–78 can be simultaneously operable. For a situation wherein all switches 71–78 are in simultaneous operation switch 71 will remain under interrogation for a time equivalent to six periods of a 139 HZ control signal frequency as previously described. Similarly, switches 72–78 will also remain under interrogation for six periods of their respective control signal frequencies. Table 1. which follows this paragraph indicates the time interval corresponding to interrogation of each switch 71–78 under the condition of simultaneous operation of all transmitter channel switches 71–78. Also indicated in Table 1. at Column (*d*), is the time lapse before a switch is re-interrogated. Because of this time delay the output networks C–J of the control system, operation of which will be discussed in connection with discriminator network B, hold their respective output signals for a predetermined time interval after decoder 60 has interrogated a corresponding switch 71–78. This holding period integrates the output so that it appears continuous even though there is a lapse before re-interrogation of a switch begins again. When less than all switches 71–78 are being operated simultaneously shorter holding times can prevail.

TABLE 1

| (a) Control Signal Frequency (HZ) | (b) Transmitter Channel Switch Nos. | (c) Interrogation Time (m.s.) for 6 Cycles of Interrogation by Multiplexer 140 | (d) Time Lapse (m.s.) Before Next Interrogation by Multiplexer 140 |
|---|---|---|---|
| 139 | 71 | 43 | 151.5 |
| 158 | 72 | 38 | 156.5 |
| 185 | 73 | 32.4 | 162.1 |
| 222 | 74 | 27 | 167.5 |
| 278 | 75 | 21.6 | 172.9 |
| 370 | 76 | 16.2 | 178.3 |
| 554 | 77 | 10.8 | 183.7 |
| 1100 | 78 | 5.5 | 189.0 |
| Total Interrogation Time | | 194.5 (m.s.) | |

Operation of discriminator network B can be illustrated by considering the example wherein transmitter switch 71 is at the number 4 contact position. Thus conductor 192 carries a 139 HZ control signal frequency. It is a function of discriminator network B to identify the frequency of this signal as 139 HZ and to measure the duty portion as corresponding to the number 4 contact position of switch 71.

Referring to FIG. 6 wherein the wave forms illustrated correspond to the example cited above, the conductor 192 signal enters flip-flop 210, through conductor 194. The conductor 212 signal emerging from flip-flop 210 has an up portion for one period of a 139 HZ cycle and a down portion for the next period of a 139 HZ cycle. The conductor 212 signal and a 100 KHZ clock pulse signal in conductor 204 from signal source 200, enter nand gate 230 emerging in conductor 232 as a composite signal of constant value for one period of a 139 HZ control signal frequency followed by 100 KHZ clock pulses for the next period of a 139 HZ control signal frequency. Since the period of a 139 HZ control signal frequency is approximately 7.2 milliseconds the conductor 232 signal is constant for 7.2 milliseconds and has 720 clock pulses for the next 7.2 milliseconds.

Counter 240 and oneshot 250 are arranged as a divide by fifteen counter and counter 260 is arranged as a divide by six counter such that conductor 262 signal is of constant value for one period of a 139 HZ cycle and contains 720/15×6 pulses or 8 pulses for the next period of a 139 HZ cycle. Counter 270 is arranged as a zero to nine counter starting at a binary count state of 9. The binary count state of counter 270 serves to identify the frequency of the conductor 192 signal. Thus in counter 270 a binary count state of 7 (8pulses) corresponds to a 139 HZ signal. A binary count state of 7 would be present in counter 270 for any 139 HZ control signal frequency irregardless of the duty portion time interval since flipflop 210 essentially erases the duty portion interval of the 139 HZ cycle, and serves merely to identify the distance between corresponding duty portion fall times. This distance will always be the period of a 139 HZ cycle regardless of the duty portion time interval. In a like manner any 15 HZ8 duty signal would correspond to a binary count state of 6 (7 pulses) in counter 270 and so on with the 1,100 HZ duty signal corresponding to a binary count state of zero (one pulse).

Conductor 279 which communicates with counter 270 performs a safety overflow function by detecting any frequencies in conductor 192 that fall below 139 HZ. For example, as a count state of 7 in counter 270 corresponds to 139 HZ the lowest frequency in our band of interest, a binary count state in counter 270 in excess of 7 would evidence the presence in discriminator network B of a signal having a lower frequency than 139 HZ. Consequently when the binary count state of counter 270 progresses from 7 to 8, conductor 279 will change from a logic level of one to a logic level of zero. Flip-flop 220 reacts to this fall from a high to a low in conductor 279 by producing a logic level of zero in conductor **222*a*, which inhibits nand gate 230 from producing an output signal at conductor 232. Thus discriminator network B will not operate on signals below the band of interest. A frequency above the band of interest, such as one which exceeds 1100 HZ will not cause counter 270 to make a count since the 1100 HZ frequency corresponds to a binary count state of zero (one pulse) in counter 270. Counter 270** is thus insensitive to frequencies exceeding the band of interest.

Once discriminator network B has identified the conductor 192 signal as a 139 HZ signal a verification for safety purposes can be made. As mentioned in the discussion of encoder network A, multiplexer 140 interrogates any operational switch 71–78 six consecutive times before counter 50 progresses to the next binary count state. Thus 6 cycles of a duty signal will be transmitted to conductor 192. In carrying out the verification procedure counter 280 is arranged as a storage register memorizing at conductors 281, 282 and 283 the binary count state of the control signal frequency that entered conductor 192 immediately prior to the 139 HZ cycle identified in counter 270 by a binary count state of 7. If conductors 281–283 of storage register 280 are also at a binary count state of 7, then comparator 300 will cause conductor 302 to have a logic level of one which signifies verification. Should there be a disparity in the binary count states of counter 270 and storage register 280 comparator 300 will cause conductor 302 to have a logic level of zero.

Figure 1:
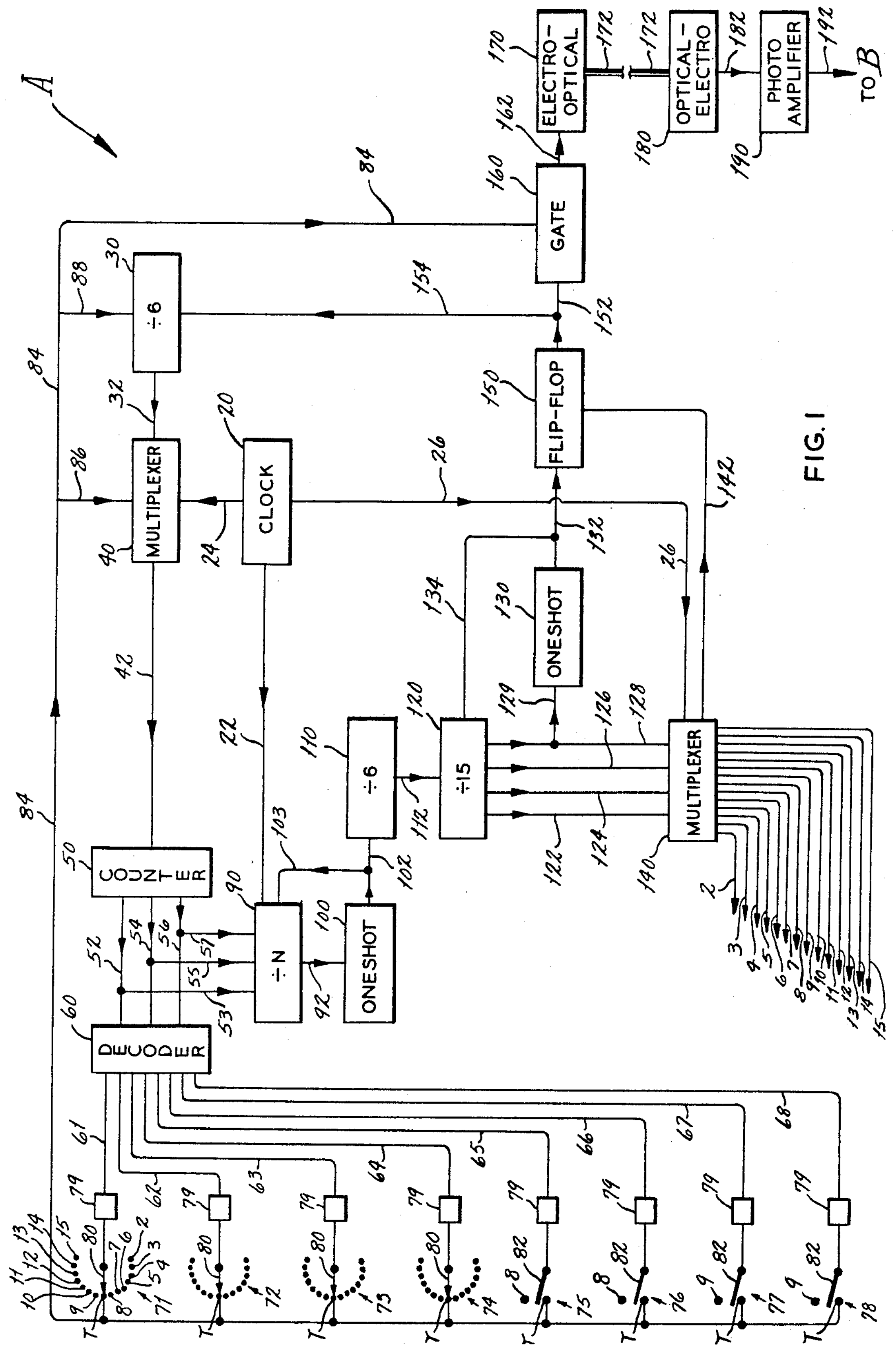
Figure 2:
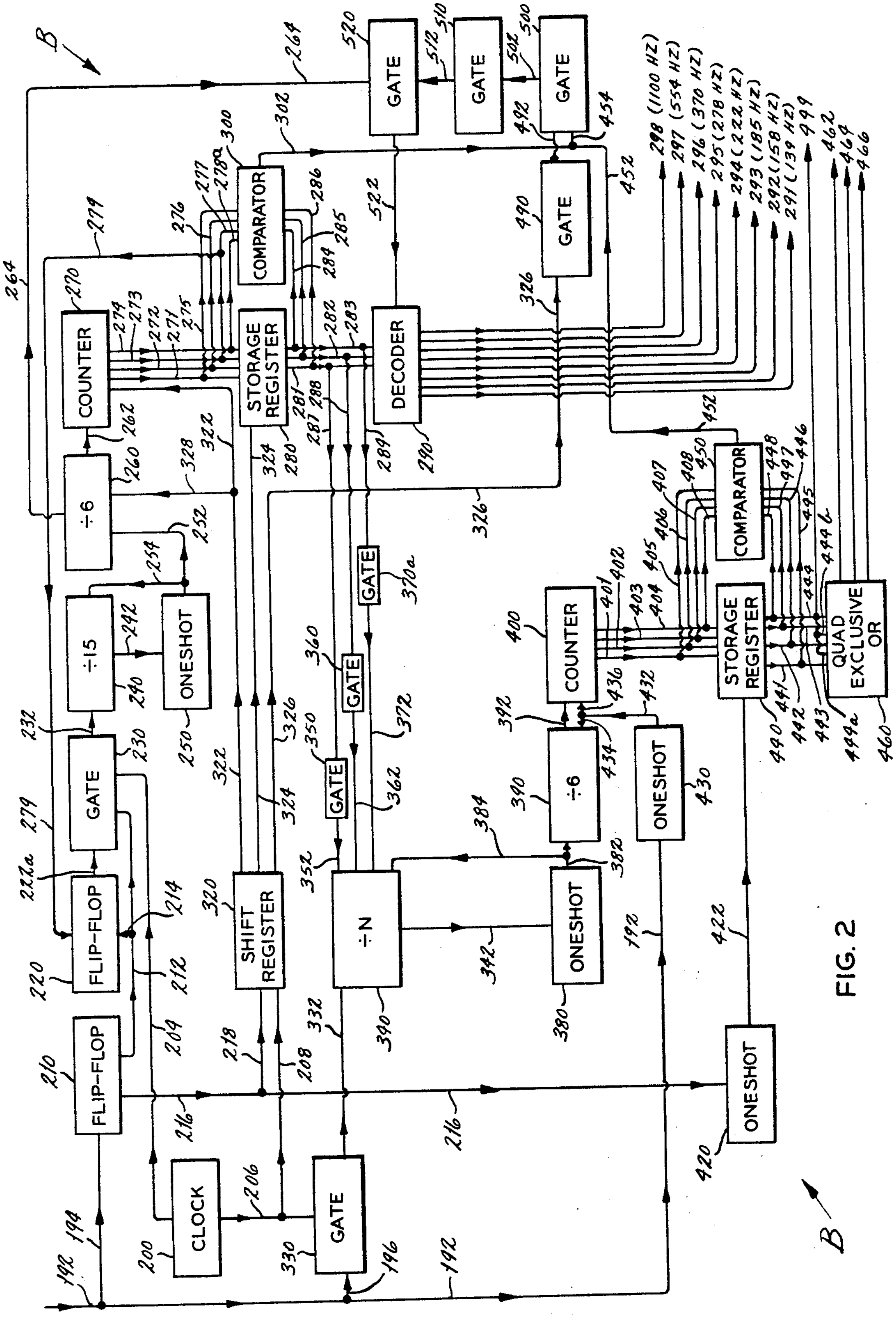
FIG. 2 is a simplified schematic diagram of the discriminator network that communicates with the optical-electro conversion means.

Decoder 290 is arranged to accept the binary count state of storage register 280 to activate one of the conductors 291–298. Conductors 291–298 correspond to a respective control signal frequency as indicated in FIG. 2. Each conductor 291–298 leads to a separate output network as will be described in due course. Since a binary count state of 7 in counter 270 and storage register 280 correspond to a control signal frequency of 139 HZ decoder 290 will activate conductor 291 to a logic level of zero.

With the control signal frequency of the conductor 192 signal identified in counter 270, it is also necessary to measure the duty portion of this signal and the directional output for cases where switches 71–74 are in operation. To accomplish this the conductor 192 signal is fed into nand gate 330 through conductor 196, along with a 100 KHZ signal from source 200 through conductor 206.

Reference is now made to FIG. 7 wherein the wave forms illustrated correspond to the example of a 139 HZ signal in conductor 192 with switch 71 at the number 4 contact position. The composite signal in conductor 332 contains 100 KHZ clock pulses for the up time portion of the conductor 192 signal, and an absence of pulses for the down time portion thereof.

The conductor 332 signal is then passed through counter 340 arranged with oneshot 380 as a divide by N counter where N can equal 1, 2, 3, 4, 5, 6, 7 or 8. Nand gates 350, 360 and 370*a* are arranged intermediate storage register 280 and counter 340 as inverters. The value of N in counter 340 is determined by the binary count state of storage register 280. For a 139 HZ signal the binary count state of storage register 280 is 7. Oneshot 380 adds an extra count to counter 340 such that counter 340 divides by 8 when storage register 280 is at a binary count state of 7. The value of N associated with each control signal frequency in counter 340 is exactly the same as the N values associated with each control signal frequency in counter 90 of encoder A. Counter 340 thus divides by 7 in response to a 159 HZ signal, divides by 6 in response to a 185 HZ signal, divides by 5 in response to a 222 HZ signal, divides by 4 in response to a 278 HZ signal, divides by 3 in response to a 370 HZ signal, divides by 2 in response to a 554 HZ signal, and divides by 1 in response to an 1,100 HZ signal.

The 100/N KHZ pulses of the conductor 332 composite signal are divided by 6 in counter 390. In this manner of dividing the conductor 332 composite signal by N×6 the conductor 392 composite signal will always have a pulsed portion of less than 15 pulses. The number of pulses in the conductor 392 signal relates to the number of the engaged contact position of switch 71 and represents a measure of the duty portion of the 139 HZ control signal in conductor 192. For example with switch 71 in the number 4 contact position the corresponding 139 HZ control signal frequency will produce a pulsed portion in the conductor 392 composite signal that pulses counter 400 to a binary count state of 3. If switch 71 were in the number 2 position counter 400 would be at a binary count state of 1; in the number 3 position counter 400 would be at a binary count state of 2 and so on up to a binary count state of 14 corresponding to the number 15 switch position. Discriminator network B has thus measured the duty portion of the 139 HZ signal. For safety purposes this measurement is also verified as hereinafter discussed.

Counter 440 is arranged as a storage register and memorizes the duty portion pulse count of a control signal frequency that entered conductor 192 immediately prior to the 139 HZ control signal that was measured in counter 400. If conductors 441–444 of storage register 440 as well as conductors 401–404 of counter 400 are at a binary count state of 3 then comparator 450 will cause conductor 452 to be at a logic level of one signifying an equal comparison or verification. If there is a disparity between the binary count states of counter 400 and storage register 440 comparator 450 will cause conductor 452 to be at a logic level of zero.

The control signal frequency duty portion measured by the binary count state of storage register 440 represents a rate as well as a direction of movement of the derrick operating member that is associated with the signal frequency and its corresponding channel transmitter switch 71–74. A 139 HZ frequency control signal having a binary count state of 7 in counter 400 corresponds to the number 8 contact position of switch 71, whereas a binary count state of one corresponds to the number 2 contact position. The number 8 contact position and the number 2 contact positions respectively represent the slow and fast limit rates of movement in one direction of the operating member associated with switch 71 with progressively faster intermediate rates corresponding to contact positions 7 through 3. Switch positions 9–15 of switch 71 represent progressively faster rates of operating member movement in an opposite direction to that defined by contact positions 2–8. However the rates of movement represented by contact positions 8 and 9, 7 and 10, 6 and 11, 5 and 12, 4 and 13, 3 and 14 and 2 and 15 are equivalent. The same rate and directional relationships apply to contact positions 2–15 of switches 72–74.

As is well known in the art the numbers 1 through 7 can be expressed as a four digit binary number wherein the leading digit in each of these binary numbers is a binary zero. Further, the numbers 8–14 can also be expressed as four digit binary numbers wherein the leading digit for each of these numbers is a binary 1. Consequently when switch 71 is at any of the contact positions 2–8 (corresponding to binary count states of 1 to 7 in counter 400) conductor 449 which represents the leading digit of the binary count state of storage register 440 will be at a logic level of zero. Further, when switch 71 is at any of the contact positions 9–15 conductor 449 will be at a logic level of one. A logic level of zero in conductor 449 thus represents movement in one direction whereas a logic level of one represents movement in the opposite direction.

Since the movement rates of an operating member as defined by switch contact positions 2–8 and 15–9 are essentially equivalent, the binary count states 8 through 14 can be represented on conductors 462, 464 and 466 as binary count states 7 through 1, respectively. To accomplish this, conductor 449 is connected to conductor 444 and conductor 444 is branched into conductors 444*a* and 444*b* such that conductors 449, 444, 444*a* and 444*b* are at the same logic levels. Conductors 441 and 444*a*, 442 and 444*b* and 443 and 444 are arranged as paired conductors entering quad exclusive OR element 460 which inverts binary numbers 8–14 in a known manner to binary numbers 7–1. As a consequence of this operation the movement rates of switch contact positions 9–15 can be identified by the same binary numbers at conductors 462, 464 and 466 as movement rates corresponding to switch contact positions 2–8. Since contact positions 2–8 and 9–15 represent movement in opposite directions the distinction therebetween can be identified by referring to the logic level of conductor 449 which will be zero for movement in one direction and 1 for movement in an opposite direction.

As switch 71 is interrogated six consecutive times by decoder 140 and 6 cycles of the 139 HZ duty signal pass into discriminator network B it is desirable that the measurements made by counters 270 and 400 be free from the influence of previous measurements made therein. Shift register 320 thus receives a 139/2 HZ signal from flip-flop 210 in conductors 216 and 218, along with a 100 KHZ signal via conductors 206, 208. Conductors 322, 324 and 326 can then be sequentially activated at clock rate. A clock pulse in conductor 322 performs an initiate function whereby counters 260 and 270 are initiated in a known manner to their desired starting states such as a count state of 3 in counter 260 and a count state of 9 in counter 270. A similar initiate function is performed by oneshot 430 which initiates counters 390 and 400 to a desired starting state.

A clock pulse in conductor 324 activates a store function wherein storage register 280 is commanded to accept the binary count state of counter 270. A similar store function is activated by oneshot 420 which receives a signal from flip-flop 210 through conductor 216 and sends out a pulse in conductor 422 commanding storage register 440 to accept the binary count state of counter 400.

A clock pulse in conductor 326 activates a compare function wherein comparator 300 is commanded to make a comparison of the binary count states of counter 270 and storage register 280 and comparator 450 is commanded to make a comparison of the binary count states of counter 400 and storage register 440. Should there be an equal comparison by both comparators 300 and 450, conductors 302, 452 and 454 will have a logic level of one. Should either comparator 300 or 450 net have an equal comparison, conductors 302, 452 and 454 will have a logic level of zero.

Conductors 322, 324 and 326 are each pulsed once in sequence at clock rate, these sequential pulses occurring once every other period of the control signal frequency. Therefore, since each operating switch can transmit six consecutive cycles into conductor 192 the compare, store and initiate functions occur at counters 270 and 400 three times, the remaining three cycles being used for loading counters 270 and 400 with binary count states that correspond to the control signal frequency and duty portion.

It should be noted that the compare, store and initiate functions occur in the sequence just stated. During the compare function conductor 326 is at a logic level of zero. Nand gate 490 converts this compare signal to a logic level of one in conductor 492. Conductor 454 is also at a logic level one, when equal comparisons have been made in comparators 300 and 450. Consequently nand gate 500 will produce a logic level of zero in conductor 502 that is inverted by nand gate 510 to a logic level of one at conductor 512. Thus conductor 512 is at a logic level of one when the compare function of conductor 326 has been activated and equal comparisons have been made in counters 300 and 450.

As an additional safety check within discriminator network B conductor 264 forms a line of communication between counter 260 and nand gate 520 serving as a remainder detector. If there is a remainder in counter 260 following the divide by 6 function conductor 264 will have a logic level of zero. Conductor 264 will have a logic level of one when there are no remainders in counter 260.

Assuming there are no remainders in counter 260, and that equal comparisons have been made at comparators 300 and 450, conductors 264 and 512 will have logic levels of one. Nand gate 520 then produces a logic level of zero in conductor 522 which zero logic level enables decoder 290 to activate one of the conductors 291–298 in accordance with the binary count state of storage register 280. Should either conductor 264 or 512 have a logic level other than one decoder 290 is inhibited from activating any of the conductors 291–298.

In summary, in order to receive an output signal from discriminator network B at conductors 291–298 of decoder 290 there must be a compare request signal present in conductor 326. The comparison performed in comparators 300 and 450 must show equal measurements and there must be no remainder in counter 264. Thus in the example of the 139 HZ control signal frequency transmitted by encoder A when switch 71 is at the number 4 contact position, discriminator network B identified the control signal frequency at counter 270 and measured the duty portion thereof at counter 400. This information is interpreted as a logic level of zero at conductor 291, a logic level of zero at conductor 449 and a binary count state of 3 at conductors 462, 464 and 466.

Figure 3:
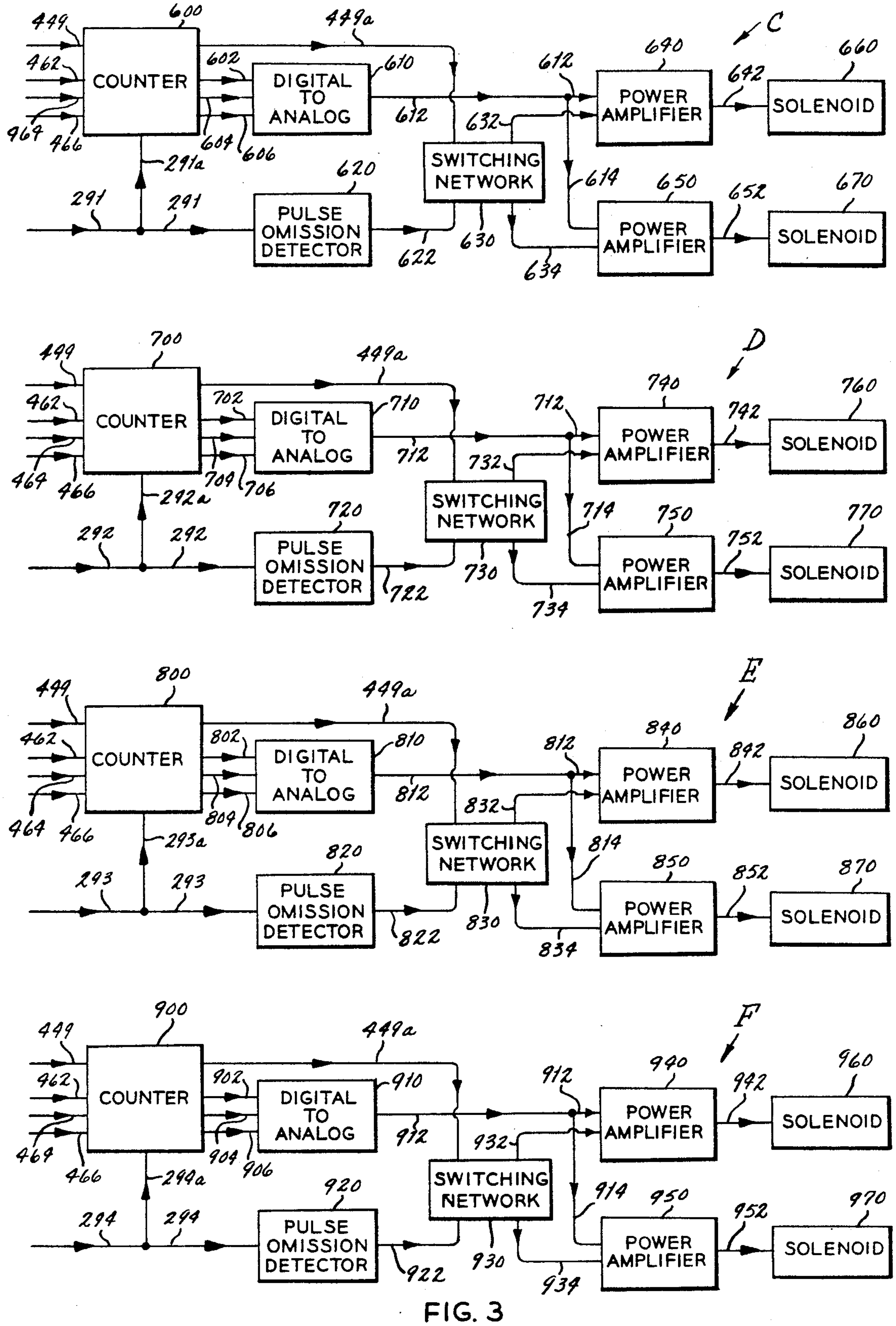
FIG. 3 is a simplified schematic diagram of the dual proportional output networks that communicate with the discriminator network.
Figure 4:
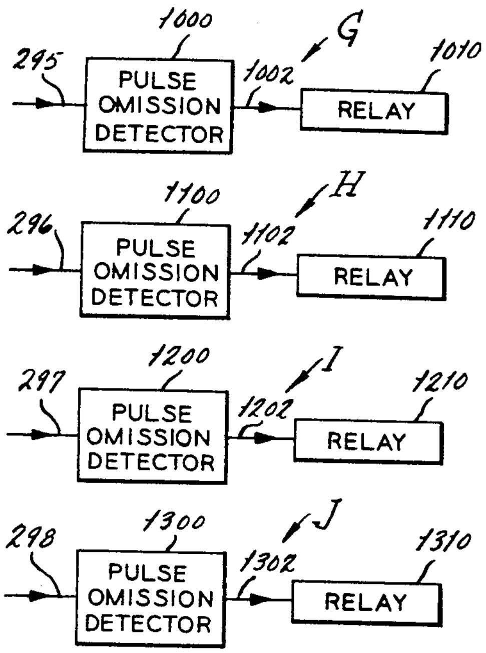
FIG. 4 is a simplified schematic diagram of the digital driver output networks that communicate with the discriminator network.

Referring to FIG. 3 and considering the example cited above conductors 291, 449, 462, 464 and 466 communicate with dual proportional output network C. Counter 600 is pulsed to a binary count state that corresponds to the logic levels of conductors 462, 464 and 466. This binary count state represents the duty portion or rate of movement of an operating member associated with the 139 HZ control signal frequency. The logic level of conductor 449 represents the direction of movement of the operating member.

Conductor 291 when activated by decoder 290 is at a logic level of zero and communicates with counter 600 through conductor 291*a*. The zero logic level in conductor 291*a* enables counter 600 to provide an output at conductors 449*a*, 602, 604 and 606 which output exactly corresponds to the input at conductors 449, 462, 464 and 466, respectively.

Digital to analog converter 610 converts the binary count state of counter 600 in any suitable known manner to a voltage in conductor 612. The magnitude of the conductor 612 voltage is dependent upon the binary count state of counter 600, being a maximum for a binary count state of 1 and a minimum for a binary count state of 7, with intermediate progressively increasing voltages as the binary count state goes from 7 to 1.

Pulse omission detector 620 is arranged to produce a logic level of zero at conductor 622 when any pulse is detected in conductor 291. A logic level of zero in conductor 291 indicates the presence of a pulse therein.

Switching network 630 produces a logic level of zero at conductors 632 and 634 when conductors 449*a* and 622 have zero logic levels. A logic level of zero in conductor 632 enables power amplifier 640 to accept voltage from conductor 612 and provide an output at conductor 642 to energize solenoid 660 which controls movement of a derrick operating member in one direction. Conversely a logic level of zero in conductor 634 inhibits power amplifier 650 from accepting voltage from conductors 612, 614, thereby preventing amplifier 650 from producing an output at conductor 652.

Similarly, switching network 630 produces a logic level of 1 at conductors 632 and 634 when conductor 449*a* is at a logic level of 1 and conductor 622 is at a logic level of zero. Under these conditions amplifier 640 is inhibited from producing an output whereas amplifier 650 is enabled to provide an output that will energize solenoid 670 which controls movement of a derrick operating member in a direction opposite to that controlled by solenoid 660.

Amplifiers 640 and 650 are both inhibited from accepting voltage from converter 610 when conductor 622 is at a logic level of 1, as when switching network 630 does not detect any pulses in conductor 291, conductor 291 being at a logic level of 1. Further, when conductor 291 is at a logic level of 1 as when decoder 290 is not activating conductor 291 counter 600 is inhibited from transferring the information at conductors 449, 462, 464 and 466 to conductors 449*a*, 602, 604 and 606.

Referring again to the example of the 139 HZ duty signal, solenoid 670 will be energized when switch 71 is at any of the contact positions 9–15, in which case conductors 449 and 449*a* will have a logic level of 1.

Under the present arrangement of encoder network A and discriminator network B, dual proportional output network C can receive two consecutive pulses at conductor 291, when switch 71 is at the number 4 contact position. This is based on counters 270 and 400 being loaded 3 times, from which 2 equal comparisons can be made at comparators 300 and 450. If the remaining switches 72–78 are all being operated there can be a maximum delay (per Table 1) of 151.5 milliseconds before switch 71 is reinterrogated and network C is again pulsed at conductor 291. Network C can be arranged in any suitable known manner to hold its output at solenoids 660 or 670 for approximately this delay time such that the output will appear continuous even though it is updated after a 151.5 millisecond interval.

The final electrical output signal corresponding to switches 72–74 resides in networks D, E and F, respectively, which are substantially similar to network C, differing only in the presence of one of the conductors 292–294. It should also be noted that conductors 449, 462, 464 and 466 are connected in common to each of the networks C, D, E and F and that the operation of these networks is substantially the same.

The solenoids contained in networks C, D, E and F can be used in any known manner to provide variable speed and bidirectional control over various operating members of a derrick such as one or more articulating beams, bidirectional rotational motors and extensible hoists. The manner whereby derrick beam articulation can be controlled by a solenoid is disclosed in the copending application of Roy Balogh, Ser. No. 165,916 filed July 26, 1971. Solenoid control of a variable speed bidirectional motor and an extensible retractable apparatus can be accomplished in any suitable known manner. The solenoids can also be used in any suitable known manner to control any other known bidirectional or unidirectional variable speed movable devices.

The final electrical output signal corresponding to operation of switches 75–78 resides in digital driver networks G, H, I and J which respectively operate in substantially the same manner. In network G which is typical, pulse omission detector 1000 will provide an output voltage in conductor 1002 capable of driving relay 1010 when a pulse is produced in conductor 295, as when decoder 290 activates conductor 295 to a logic level of zero. No voltage is present in conductor 1002 when conductor 295 is at a logic level of 1. Since switch 75 has only one operative contact position, the 278 HZ control signal frequency associated with switch 75 has only one fixed value duty portion. There is thus no need to measure the duty portion of 278 HZ duty cycle or its directional output. Consequently conductors 449, 462, 464 and 466 are not present in network G.

Networks H, I and J differ from network G only in the presence of one of the conductors 296–298, each of which conductors is respectively associated with the 370, 554 and 1,100 HZ control signal frequencies.

Any of the relays 1010, 1110, 1210 or 1310 can be arranged in any known manner to independently actuate a known buzzer, a known lamp, a known engine starter motor or a known engine cutout device for stopping an engine. A variety of other known devices which are controllable by simply turning them on or off can likewise be independently associated with a respective relay switch as contained in networks G, H, I and J.

As will be apparent to those skilled in the art, the operation of the present remote control system need not be limited to the frequencies disclosed herein. Entirely different bands of frequencies can be used in the remote control system and the number of differing control signal frequencies within a band can far exceed the number disclosed herein. For example, if it were desired to remotely control twelve different operating members and eighteen different accessories, a band of thirty different channel signal frequencies could be designated. Although control signal frequency transmitter switches having two positions and fourteen positions have been disclosed, transmitter switches having any number of contact positions can be used and more than two switch types can be incorporated into the encoder network. Although two consective signal pulses are fed to an output network C–J when a corresponding channel transmitter switch 71–78 is in operating position, the system can be arranged to provide more or less consecutive pulses to these output networks as by changing the divisor of counter 30. Although the duty portion of a control signal frequency can be measured by the duration of a light pulse the system can also be arranged such that the duty portion is measured by the absence of a light pulse during the period of a light signal frequency. Although second source generator 200 in discriminator B produces the same clock rate signal as first source generator 20 in encoder A, there is no necessity for such correspondency. Identification of the control signal frequency and measurement of the duty portion can be accomplished using a different clock signal in discriminator B with correspondingly different divider components.

Some advantages of the novel remote control system evident from the foregoing description include a system wherein a plurality of differing control signal frequencies can be transmitted through the same light transmission member regardless of the number of differing control signal frequencies. Another advantage is a system wherein a remote control transmitter is insulated from the remote control receiver, thereby eliminating the electrical hazards that exist in non-insulated remote control systems. Further advantages include a remote control system that is not influenced by the corona effect of high power lines, and a system that can be adapted to remotely control any number of operating members and accessories.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A system for controlling remote energization of a plurality of output networks corresponding to operating members and accessories of an aerial device comprising encoder means at one location on said aerial device for producing a plurality of differing electrical control signal frequencies, each different control signal frequency corresponding to a separate said output network, electro-optical conversion means communicating with the electrical control signal frequencies of said encoder means for converting said electrical control signal frequencies to corresponding light signal frequencies, a light transmission member communicating with said electro-optical means for transmitting said light signal frequencies from said electro-optical conversion means to a second location on said aerial device remote from said first location, optical-electro conversion means communicating with said light transmission member at said second location on said aerial device, for converting said light signal frequencies back to their corresponding electrical control signal frequencies, and discriminator means communicating with said optical-electro conversion means for identifying each said electrical control signal frequency from said optical-electro conversion means, said discriminator means further communicating with said output networks and including means for directing each said identified control signal frequency to the output network associated with that frequency.

2. A system as claimed in claim 1 wherein said light transmission member comprises an elongated flexible light transmission tube shielded from outside light and having one end portion joined to said electro-optical conversion means and another end portion joined to said optical-electro conversion means.

3. A system as claimed in claim 1 wherein said encoder means comprises a first source generator for generating a first input clock rate frequency, and a first group of divider components communicating with said first source for dividing the frequency of said first input clock rate frequency into a predetermined band of said differing electrical control signal frequencies.

4. A system as claimed in claim 3, wherein said encoder means further comprises a first binary counter communicable with said first source generator, said band of electrical control signal frequencies being produced in said encoder in a predetermined sequence determined by the binary count state of said first binary counter.

5. A system as claimed in claim 3 wherein said encoder means further comprises a first binary counter, said first group of divider components communicating with said first binary counter such that the frequency of the electrical control signals produced by said first group of divider components is determined by the binary count state of said first binary counter.

6. A system as claimed in claim 5 wherein said encoder means further comprises a plurality of control signal frequency transmitter switches and a first binary to decimal decoder communicating with said first binary counter, said first decoder further communicating with said transmitter switches one at a time in an order determined by the binary count state of said first binary counter.

7. A system as claimed in claim 6 wherein said encoder means further includes a first multiplexer interposed between said first source generator and said first binary counter, and arranged to communicate with said frequency transmitter switches, said frequency transmitter switches having at least one operable contact position and an inoperable contact position, said first decoder causing said first multiplexer to inhibit communication between said first source generator and said first binary counter when said decoder interrogates a frequency transmitter switch having an operable contact engaged, the inhibiting action of said first multiplexer enabling said first group of dividers to operate on said first input clock rate frequency to yield a control signal frequency corresponding to the frequency transmitter switch being interrogated by said first decoder.

8. A system as claimed in claim 7 wherein said encoder means further comprises a second multiplexer communicating with said first group of divider components and a second constant divider interposed between said first multiplexer and said second multiplexer, said second constant divider arranged to communicate with said first binary counter through said first multiplexer when said first decoder communicates with a frequency transmitter switch having an operable contact engaged such that said first binary counter is pulsed at a rate equivalent to the control signal frequency divided by the divisor of said second constant divider.

9. A system as claimed in claim 8 wherein said first binary counter is arranged to communicate with said first source generator through said first multiplexer when said first decoder communicates with a frequency transmitter switch having no operable contact engaged, such that said first binary counter is pulsed at clock rate.

10. A system as claimed in claim 7 wherein said encoder means further include a second multiplexer communicating with said first group of divider components and arranged to interrogate the contacts of a control frequency transmitter switch having at least one operable contact engaged when the binary count state of said first binary counter corresponds to the control frequency transmitter switch having the operable contact engaged.

11. A system as claimed in claim 10 wherein said first group of dividers includes a first constant divider communicating with said second multiplexer, and the frequency transmitter switch having at least one operable contact engaged is a multi-contact switch, said second multiplexer including a plurality of terminals corresponding to the operable contacts of said multi-contact switch, said second multiplexer sequentially interrogating the individual operable contacts of said multi-contact switch when said first binary counter is at a binary count state corresponding to said multi-contact switch, the sequence of interrogation by said second multiplexer of said multicontact switch contacts being determined by the binary count state of said first constant divider, said multiplexer producing a pulse when one of the multiplexer terminals corresponding to the engaged operable contact on said multi-contact switch discovers said engaged operable contact, said multiplexer pulse serving to define a duty portion of the control signal frequency corresponding to said multi-contact switch.

12. A system as claimed in claim 11 wherein said encoder means further include means for operating on the control signal frequency produced by said first group of dividers and the pulse produced by said second multiplexer to characterize the control signal frequency with a duty cycle waveform having a duty portion corresponding to the engaged operable contact of said frequency transmitter switch.

13. A system as claimed in claim 12 wherein said means for operating on said control signal frequency and the pulse produced by said second multiplexer comprise a first flip-flop.

14. A system as claimed in claim 11 wherein said electro-optical conversion means is communicable with said control signal frequency, said electro-optical conversion means producing a light pulse representative of the duty portion of said control signal.

15. A system as claimed in claim 12 wherein said encoder means further includes first gating means interposed between said electro-optical conversion means and said means for operating on the control signal frequency, said first gating means communicating with said frequency transmitter switches and arranged to permit passage of an electrical control signal frequency to said electro-optical conversion means when said second multiplexer interrogates a frequency transmitter switch having an engaged operable contact.

16. A system as claimed in claim 15 wherein said light transmission member comprises an elongated flexible light transmission tube shielded from outside light and having one end portion joined to said electro-optical conversion means and another end portion joined to said optical-electro conversion means.

17. A system as claimed in claim 1 wherein said discriminator means comprises a second source generator for generating a second input clock rate frequency and first means for combining said second input clock rate frequency with a control signal frequency entering said discriminator means from said optical-electro conversion means, said combining means forming a first composite signal comprising clock pulses for one cycle of said control signal frequency followed by an absence of pulses for the next cycle of said control signal frequency.

18. A system as claimed in claim 17 wherein said combining means for forming said first composite signal include a second flip-flop communicating with said control signal frequency, and second gating means communicating with said second flip-flop and said second source generator.

19. A system as claimed in claim 17 wherein said discriminator means further comprise a second group of divider components arranged to receive said first composite signal to divide the frequency of the second input clock rate pulses of said first composite signal by a second predetermined divisor to produce a second pulse quotient representing the frequency of the electrical control signal entering said discriminator means from said optical-electro conversion means.

20. A system as claimed in claim 19 wherein said discriminator means further comprise a second binary counter communicating with said second group of divider components to count said second pulse quotient.

21. A system as claimed in claim 20 wherein said control signal frequency directing means include a second binary to decimal decoder arranged to receive the binary count state of said second binary counter, said second decoder arranged to communicate one at a time with said output networks in an order determined by the binary count state of said second binary counter as received by said second decoder.

22. A system as claimed in claim 21 wherein at least one of said output networks comprises a pulse omission detector and a relay, said relay being actuated when said second decoder communicates with said one of said output networks.

23. A system as claimed in claim 21 wherein said discriminator means further include a first storage register communicating with said second binary counter and said second decoder, said discriminator means further including a first comparator communicating with said second binary counter and said first storage register, said first comparator inhibiting said second decoder from communicating with said first storage register when the binary count states in said second binary counter and said first storage register do not compare equally in said first comparator.

24. A system as claimed in claim 23 wherein said discriminator means further include fourth gating means interposed between said first comparator and said second decoder such that said fourth gating means inhibit said second decoder from communicating with said first storage register when the binary count states in said second binary counter and said first storage register do not compare equally in said first comparator.

25. A system as claimed in claim 24 wherein said fourth gating means communicate with said second group of divider components, said fourth gating means inhibiting said second decoder from communicating with said first storage register when a first predetermined signal from said second group of divider components enters said fourth gating means.

26. A system as claimed in claim 20 wherein said discriminator means include a third flip-flop communicating with said second flip-flop, said second binary counter and said second gating means, said third flip-flop inhibiting said second gating means from communicating with said second group of divider components when said third flip-flop receives a second predetermined signal from said second binary counter.

27. A system as claimed in claim 20 wherein a light signal frequency entering said light transmission member comprises light pulses having a duration representing a duty portion of a control signal frequency cycle said discriminator means further including second means for combining said second input clock rate frequency with the control signal frequency entering said discriminator means from said optical-electro conversion means, said second combining means forming a second composite signal comprising clock pulses for the duty portion of one cycle of said control signal frequency followed by an absence of pulses for the remainder of said one cycle.

28. A system as claimed in claim 27 wherein said combining means for forming said second composite signal include third gating means communicating with said control signal frequency and said second source generator.

29. A system as claimed in claim 27 wherein said discriminator means further include a third group of divider components arranged to receive said second composite signal to divide the frequency of the second input clock rate pulses of said second composite signal by a third predetermined divisor.

30. A system as claimed in claim 29 wherein said third group of divider components are arranged to receive the binary count state of said second binary counter to determine a third divisor of said third group of divider components, said third divisor causing said third group of divider components to produce a third pulse quotient representing the duty portion of the electrical control signal frequency entering said discriminator means from said optical-electro conversion means.

31. A system as claimed in claim 30 wherein said discriminator means further include a third binary counter communicating with said third group of divider components to count the third pulse quotient.

32. A system as claimed in claim 30 wherein said control signal frequency directing means include a second binary to decimal decoder arranged to receive the binary count state of said second binary counter, said second decoder arranged to communicate one at a time with said output networks in an order determined by the binary count state of said second binary counter as received by said second decoder.

33. A system as claimed in claim 32 wherein said discriminator means further include a third binary counter communicating with said third group of divider components to count the third pulse quotient.

34. A system as claimed in claim 33 wherein said discriminator means further include a first storage register communicating with said second binary counter and said second decoder and a second storage register communicating with said third binary counter and at least one of said output networks, said discriminator further including a second comparator communicating with said third binary counter and said second storage register, said second comparator inhibiting said second decoder from communicating with said first storage register when the binary count states in said third binary counter and said second storage register do not compare equally in said second comparator.

35. A system as claimed in claim 34 wherein said discriminator means further include fourth gating means interposed between said second comparator and said second decoder such that said fourth gating means inhibit said second decoder from communicating with said first storage register when the binary count states in said third binary counter and said second storage register do not compare equally in said second comparator.

36. A system as claimed in claim 34 wherein said discriminator means further include a quad exclusive OR element communicating with said second storage register and at least one of said output networks.

37. A system as claimed in claim 34 wherein at least one of said output networks comprise a fourth binary counter communicating with said second storage register, and said second decoder.

38. A system as claimed in claim 37 wherein said one of said output networks further comprise a digital to analog converter communicating with said fourth binary counter and a pulse omission detector communicating with said second decoder, said one of said output networks further comprising at least one power amplifier communicating with said digital to analog converter, and first solenoid means communicating with said first power amplifier.

39. A system as claimed in claim 38 wherein said one of said output networks further include a second power amplifier communicating with second solenoid means and said digital to analog converter, said one of said output networks further comprising a switching network communicating with said pulse omission detector, said fourth binary counter, and said first and second power amplifiers such that said switching network enables one of said power amplifiers to actuate its corresponding solenoid means with voltage received from said digital to analog converter when said switching network receives a fourth predetermined signal from said fourth binary counter and a fifth predetermined signal from said pulse omission detector.

40. A system as claimed in claim 32 wherein at least one of said output networks is arranged to receive the binary count state of said third binary counter when said second decoder communicates with said one of said output networks, the binary count state of said third binary counter representing the duty portion of the control signal frequency associated with said one of said output networks.

41. A system as claimed in claim 40 wherein said one of said output networks comprise solenoid means and a digital to analog converter for converting the duty portion binary count state of said third binary counter to an analogous voltage to actuate said solenoid means when said second decoder communicates with said one of said output means.

42. A system as claimed in claim 40 wherein said one of said output networks comprise a fourth binary counter arranged to receive the binary count state of said third binary counter.

43. A system as claimed in claim 42 wherein said one of said output networks further comprise a digital to analog converter communicating with said fourth binary counter and a pulse omission detector communicating with said second decoder, said one of said output networks further comprising at least one power amplifier communicating with said digital to analog converter, and first solenoid means communicating with said first power amplifier.

44. A system as claimed in claim 43 wherein said one of said output networks further include a second power amplifier communicating with second solenoid means and said digital to analog converter, said output network further comprising a switching network communicating with said pulse omission detector, said fourth binary counter, and said first and second power amplifiers such that said switching network enables one of said power amplifiers to actuate its corresponding solenoid means with voltage received from said digital to analog converter when said switching network receives a fourth predetermined signal from said fourth binary counter and a fifth predetermined signal from said pulse omission detector.

45. A system as claimed in claim 1 wherein said encoder means comprise a plurality of individually controllable control signal frequency transmitter switches, each one of said switches being respectively actuatable to effect production of a respectively different one of said control signal frequencies.

46. A system as claimed in claim 45 wherein each one of said switches are actuatable separately or in combination with one or more of said other individually controllable swtiches.

47. A system as claimed in claim 45 wherein at least one of said switches is a multi-contact switch associated with one of said movable operating members of said aerial device, said one of said switches having at least two contact positions for effecting movement of said operating member, said operating member having one rate of movement when said one of said switches is in one of said contact positions and said operating member having a second rate of movement when said one of said switches is in said second contact position.

48. A system as claimed in claim 6 wherein said control signal frequency transmitter switches are individually controllable for actuation separately or in combination with one or more of the other said switches.

49. A system as claimed in claim 48 wherein at least one of said switches is a multi-contact switch associated with one of said movable operating members of said aerial device, said one of said switches having at least two contact positions for effecting movement of said operating member, said operating member having one rate of movement when said one of said switches is in one of said contact positions and said operating member having a second rate of movement when said one of said switches is in said second contact position.

50. A method for remotely controlling a plurality of operating members and accessories of an aerial device comprising providing a plurality of output networks at one location on the aerial device corresponding to predetermined operating members and accessories of the aerial device, the output networks serving to actuate their corresponding operating members and accessories, producing a plurality of differing electrical control signal frequencies at a second location on the aerial device remote from the first location, each different electrical control signal frequency corresponding to a different output network, converting the electrical control signal frequencies produced at the second location into corresponding light signal frequencies at the second location, transmitting all converted signal frequencies from the second location to the first location through a transmission member, converting the light signal frequencies transmitted to the first location back into their corresponding electrical control signal frequencies at the first location, identifying at the first location the frequencies of each of the differing electrical control signals, and directing the differing electrical control signal frequencies at the first location to their corresponding output networks, for energization thereof.

51. A method as claimed in claim 50 wherein the step of producing further includes actuating the production of one of the differing electrical control signal frequencies individually or in combination with one or more of the other differing electrical control signal frequencies.

52. A method as claimed in claim 50 wherein the step of producing further includes associating a control signal frequency with a duty portion corresponding to a rate of movement of a corresponding operating member of the aerial device.

53. A method as claimed in claim 52 wherein the step of identifying further includes measuring the duty portion of the control signal frequency.

54. A method as claimed in claim 53 further including causing a voltage magnitude analogous to the measured duty portion of the control signal frequency to appear in the output network corresponding to the control signal frequency having the measured duty portion.

55. A system for controlling remote energization of a plurality of output networks corresponding to operating members and accessories of an aerial device comprising, a plurality of signal control means at one location on said aerial device for effecting production of a first plurality of differing electrical control signals, each said signal control means being associated with one of said first plurality of differing electrical control signals, electro-optical conversion means communicating with the first plurality of differing electrical control signals for converting said first plurality of differing electrical control signals to corresponding differing light signals, a light transmission member communicating with said electro-optical means for transmitting said light signals from said electro-optical conversion means to a second location on said aerial device remote from said first location, optical-electro conversion means communicating with said light transmission member at said second location on said aerial device for converting said differing light signals to a second plurality of correspondingly differing electrical control signals, each of said output networks being associated with one of said second plurality of differing electrical control signals, and discriminator means communicating with said optical-electro conversion means for identifying each of said second plurality of differing electrical control signals from said optical-electro conversion means, said discriminator means further communicating with said output networks and including means for directing each said identified control signal to the output network associated with the identified control signal.

56. A system as claimed in claim 55 wherein said signal control means comprise individually controllable switches, each one of said switches being respectively actuatable to effect production of a respectively different one of said first plurality of electrical control signals.

57. A system as claimed in claim 56 wherein each of said switches is actuatable separately or in combination with one or more of said other individually controllable switches.

58. A system as claimed in claim 56 wherein at least one of said switches is a multi-contact switch associated with one of said movable operating members of said aerial device, said one of said switches having at least two contact positions for effecting movement of said operating member, said operating member having one rate of movement when said one of said switches is in one of said contact positions and said operating member having a second rate of movement when said one of said switches is in said second contact position.

59. The combination of claim 51 wherein said transmission member is an elongated light transmission tube having first communicating means at one end thereof for communicating with said encoder means and second communicating means at an opposite end thereof for communicating with said discriminator means.

60. The combination of claim 59 wherein said first communicating means comprise electro-optical conversion means for converting said control signal frequencies from said encoder means to corresponding light signal frequencies transmissible through said light transmission member.

61. The combination of claim 60 wherein said second communicating means comprise optical-electro conversion means for converting said light signal frequencies from said light transmission tube to corresponding electrical control signal frequencies such that said corresponding electrical control signal frequencies enter said discriminator means for identification and direction into said corresponding output networks.

* * * * *

UNITED STATES PATENT OFFICE
CERTIFICATE OF CORRECTION

Patent No. 3,820,070 Dated June 25, 1974

Inventor(s) Charles W. Fox

It is certified that error appears in the above-identified patent and that said Letters Patent are hereby corrected as shown below:

Abstract, line 8, "covert" should read -- convert --.
Column 3, line 41, "No. 6" should read -- No. 60 --.
Column 5, line 52, "decode" should read -- decoder --.
Column 5, line 63, ", Shift" should read --. Shift --.
Column 6, line 61, "gate 600" should read --gate 500 --.
Column 7, line 48, "660-670" should read --600-670--.
Column 8, line 52, "memer" should read --member--.
Column 11, line 23, "KHZ conductor" should read --KHZ from conductor--.
Column 11, line 66, "flipflop" should read -- flip-flop--.
Column 14, line 39, "flipflop" should read -- flip-flop--.
Column 17, line 66, "net" should read -- not--.
Column 20, line 42, "of 278 HZ" should read -- of the 278 HZ--.

Signed and sealed this 17th day of September 1974.

(SEAL)
Attest:

McCOY M. GIBSON JR.
Attesting Officer

C. MARSHALL DANN
Commissioner of Patents